United States Patent [19]

Snel et al.

[11] 4,294,197
[45] Oct. 13, 1981

[54] HAYBOX

[76] Inventors: Cornelis Snel, Atlasdreef 53, 3561 Ac Utrecht; Albert Kuus, Korhoenlaan 41, 3721 Eb Bilthoven, both of Netherlands

[21] Appl. No.: 55,959

[22] Filed: Jul. 9, 1979

[51] Int. Cl.³ .............................................. A01K 5/00
[52] U.S. Cl. .............................................................. 119/60
[58] Field of Search ................. 119/58, 59, 60; 108/2, 108/136; 222/341; 177/202, 225; 312/71, 306

[56] References Cited

U.S. PATENT DOCUMENTS

| | | | |
|---|---|---|---|
| 127,563 | 6/1872 | Carlin | 119/60 |
| 195,351 | 9/1877 | Crabb | 119/60 |
| 376,529 | 1/1888 | Kline | 119/60 |
| 763,951 | 7/1904 | Bethea | 119/60 |
| 1,421,142 | 6/1922 | Asaturian | 119/68 |
| 1,518,553 | 12/1924 | Baird | 119/27 |
| 1,580,165 | 4/1926 | Piller, Sr. | 206/252 |
| 2,083,843 | 6/1937 | Hicks | 312/71 |
| 2,255,449 | 9/1941 | Mutchler | 206/42 |
| 2,296,215 | 9/1942 | Layher | 220/93 |
| 3,004,518 | 10/1961 | Struckhoff | 119/58 |
| 3,207,363 | 9/1965 | Pollak, Jr. | 221/211 |
| 3,388,677 | 6/1968 | MacKay | 108/136 |

FOREIGN PATENT DOCUMENTS

| | | |
|---|---|---|
| 34323 | 1/1886 | Fed. Rep. of Germany . |
| 178989 | 5/1922 | United Kingdom .................. 119/60 |
| 1035658 | 7/1966 | United Kingdom . |

*Primary Examiner*—Paul J. Hirsch
*Assistant Examiner*—Robert P. Swiatek
*Attorney, Agent, or Firm*—Fleit & Jacobson

[57] ABSTRACT

Haybox for feeding horses, provided at the upper part with a cover (3) in the form of a rack with transverse bars (4) and provided at the base with a loose, spring-loaded bottom (8). This bottom can move along guide bars (10) running through perforations in the bottom, which are attached to supporting plates (12) fixed to side walls (2a) and (2b). Around the bars (10) pressure springs (11) are arranged which will press the bottom (8) in an empty condition of the box against the rack. The bottom may be made tiltable by means of a body spherical at the top (13) which abuts bottom (8), the dimension of the perforations (9) being larger than the diameter of the bars (10). The box may contain 2 or 4 pressure springs and be fixed to the wall inclined with respect to the horizontal.

13 Claims, 6 Drawing Figures

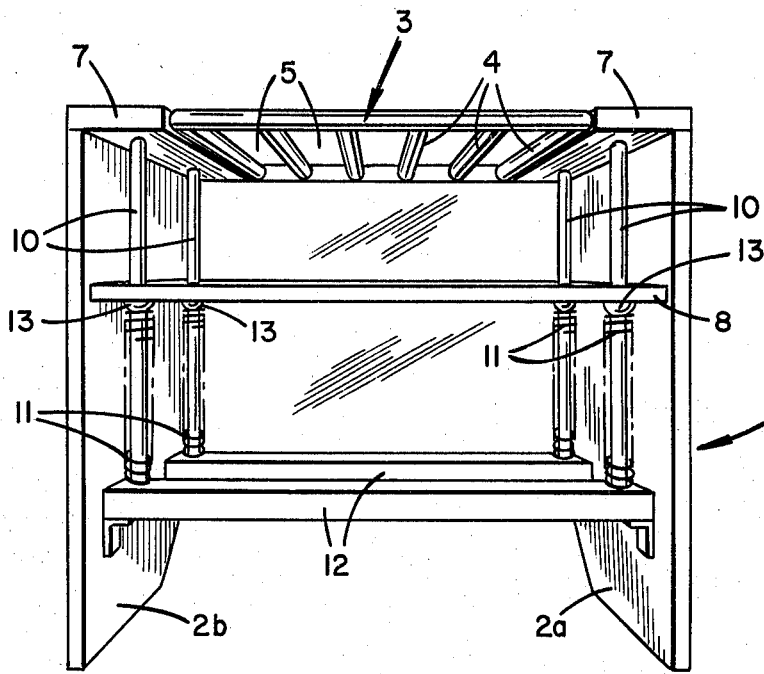
FIG. 1
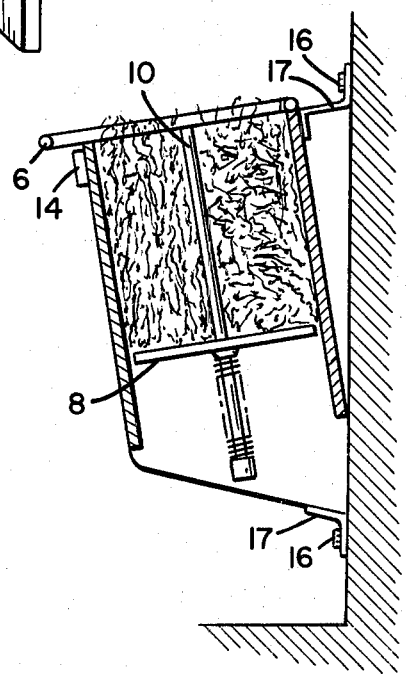
FIG. 5
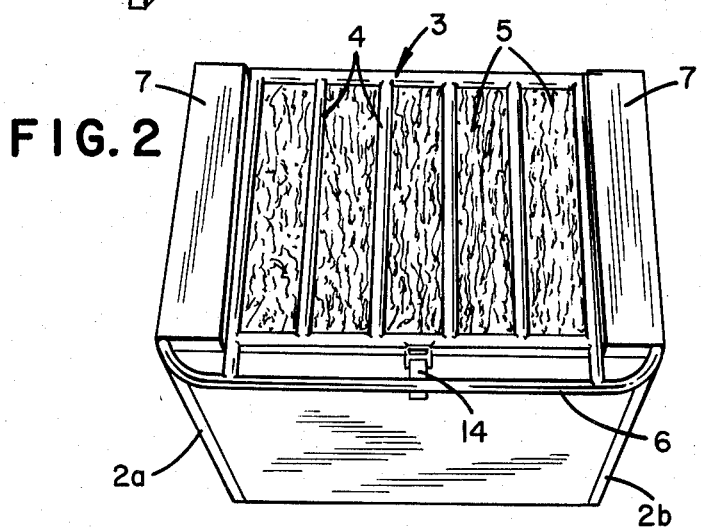
FIG. 2
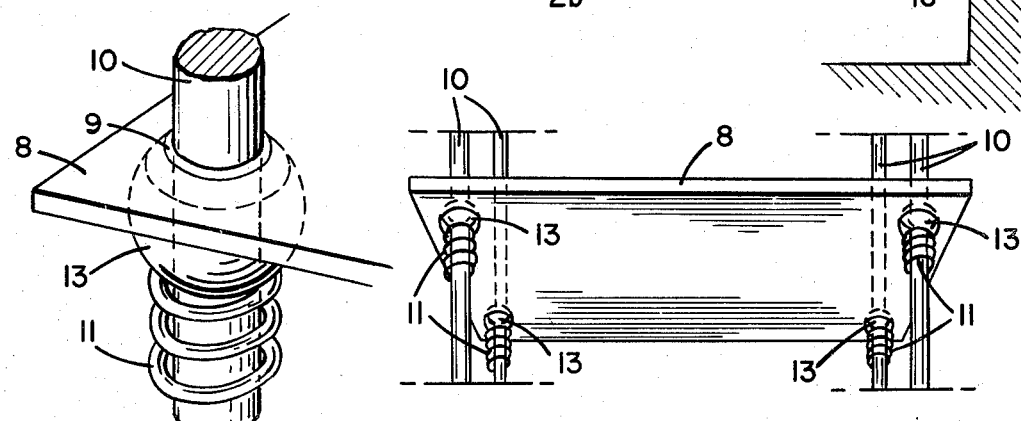
FIG. 4
FIG. 3

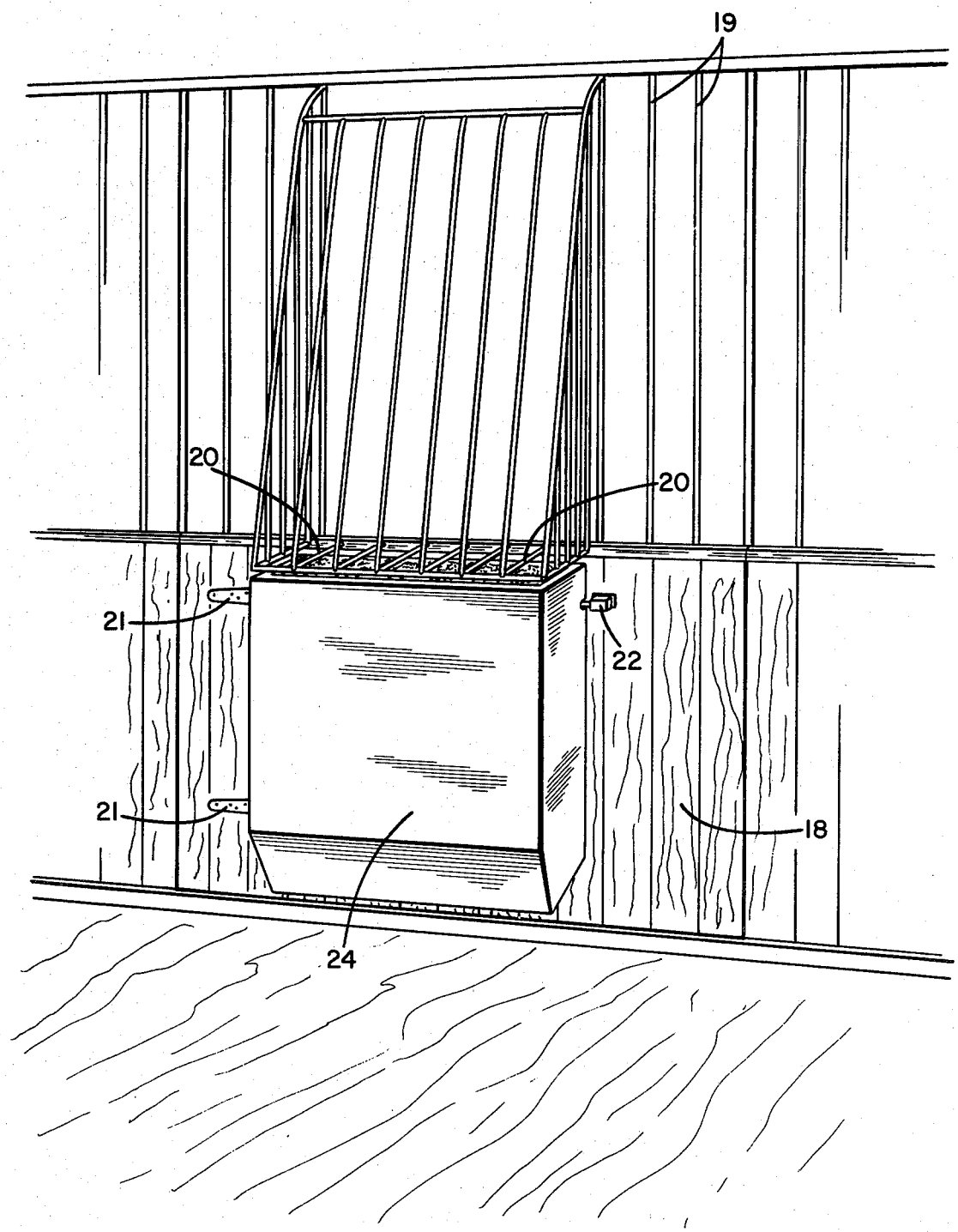

HAYBOX

The invention relates to a haybox, especially intended for the feeding of horses, provided with a cover in the form of a rack, as well as a free movable, pressure-loaded bottom. It is well known that horses, including ponies, are normally fed by means of a rack. This usually consists of a structure of bent bars, fixed to the wall, in which the hay is placed. The rack is fixed at a height such as to enable the horse to pull out the lower lying hay through the lowest openings between the bars, the consumed hay by its own weight being replaced by fresh hay.

This rack has however disadvantages. The hay, which is generally on the market in bales with sizes of about 1.0 by 0.5 by 0.4 meters, has to be loosened before it can be placed in the rack since the sizes of the rack do not correspond with those of pressed bales of hay. When the horse is eating, comparatively much hay will fall to the floor, which is in fact no longer suitable for consumption and will for the greater part get lost. Apart from this the horse, which has to pull the hay from a position above its head, will easily get particles of dust in the eyes, which will often cause the eyes to be irritated and infected and in all events requires a close care of the horse. Summarized, the objections connected with the common rack are as follows:
Increased care in view of the rack having often to be refilled and poor hygiene for the horse, since hay is unnecessarily wasted and the eating position for the horse is in fact unnatural (a natural position is that wherein the horse eats with its head directed downwards instead of upwards).

The present invention now provides a haybox which enables the horse to eat in a natural attitude, so that comparatively little hay will be wasted and the danger of irritations or infections of the eyes will be minimized. Also, it will to a much lesser extent be necessary to replenish the hay, and no longer be required to pull the bales of hay completely apart since they will at least partly fit into the haybox, so that the haybox is less labour-intensive.

In the German specification 34323 a haybox is disclosed that at the upper side is provided with a rack which can be turned up and at the base is provided with a free movable, pressure-loaded bottom, which has the capacity to move upwards and downwards in the box. The pressure on the bottom is exerted by a bar engaged in the centre of the bottom, which by means of a pulley with a fixed weight is constantly loaded. This construction is very cumbersome and occupies unproportionally much room, especially in a vertical direction. Furthermore the bottom will quickly be jammed by dust and tufts of hay. Another objection is that when the horse has eaten at one side of the rack, the pressure on the smaller area of hay, which is adjacent to the rack, may become so great that the hay will be too strongly pressed together and the horse will no longer be able to pull it apart. This is, among other things, related to the fact that the bottom has to be made rigid without being able to tilt in order to maintain an equally divided pressure.

In the box according to the invention on the other hand the bottom, especially at its sides, is spring-loaded, owing to which a great saving of space is obtained both in view of the compressibility of the springs and the fact that they may be included in the structure itself. Further in the haybox according to the invention the bottom may be made tiltable, owing to which jamming of the bottom as well as the above phenomenon of the hay at its sides being too strongly pressed together is prevented. Finally this construction allows jamming by dust or tufts of hay to be substantially avoided. The haybox according to the invention is characterized in that it consists of a multi-angular or round container of a height such as to enable the horse to eat from the rack in a natural position, the box being further provided with a loose bottom freely movable in the container, which is loaded by at least two springs and which at an empty condition of the container is pressed against the rack.

The haybox is preferably rectangular, of such dimensions that it will partly or wholly contain the ordinary, commercially available bales of hay, and of such a height that the former requirement will be met with. Thus, the dimensions as to length and width will be advantageously accommodated to the dimensions of the bales of hay that are available on the market. The space-saving construction allows the height of the box to be adjusted to 80–100 cm, preferably 90 cm, which presents the natural eating position of the horse. The box may thus be constructed in such a way that the height in the area referred to is adjustable. When it is for instance desirable to reduce the height for foals or ponies, this may, for a box placed on the floor, take place by means of a clip or plate or some other slidable construction at the bottom of the box, while in case the box is fixed to the wall a rail or slide may be used. The top of the box is closed by means of a preferably straight rack structure, consisting of a number of spikes or bars, which are placed at such a distance from each other that the horse, as in the case of common racks, can just put its mouth through without being able to entirely do so. This distance is typically about 7 cm, but for younger animals and ponies may be somewhat smaller. If desired the structure may be made in such a way that the distance between the bars is adjustable.

A box of the dimensions referred to for instance typically has six bars with five openings in between.

The rack is preferably constructed with a small inclination, so that when eating it will be easier for the horse to reach the rear side of the rack farthest away from it.

The box is characterized by a free movable, adjustable bottom, which is held under spring tension directed against gravity. Preferably the bottom is spring loaded, in the case of a rectangular box for instance by means of four pressure springs, which are resp. put at the four corners of the rectangle. These pressure springs consist of conducting rods, around which the coil or spiral is provided. The tension of the springs is chosen such as to allow the bottom to be pressed against the rack when the box is empty, while the springs themselves will be substantially pushed in when the box is entirely filled with hay.

The conducting rods provided with the spring coils are mounted on a place below the bottom, for instance suitably on cross connections or reinforcements applied between the side walls of the box. The box is anchored to the wall or floor by means of a known construction. It is advantageous when the box can be easily unfastened so that it may be removed as desired. The upper part of the box situated above the connecting rods is preferably covered, for instance by means of a plate, in order to screen off the construction of rods and also if desired to fasten the rods.

The pressure springs are preferably attached to the lower part of the bottom in such a way that the latter will be able to make a tilting movement. A simple and plain construction comprises a ball or conical shaped body or organ present at the upper side of the pressure springs, on the point where these abut against the bottom plate.

Preferably the organ consists of a non-compressible body which is spherical at the upper part and flattened at the lower part. Since the lower part need not be spherical, it can be shaped as is favourable for the attachment of the springs. The choice of an either flattened or unflattened ball in respect of the diameter of the openings in the bottomplate determines the degree of tilting movement the bottom can carry out in addition to the thickness of the bottomplate and the diameter of the guide bars.

In general the greater the tiltability the less the bottom tends to get jammed. It will be understood that the ratios of the aforementioned parameters, especially the clearance of the guide bars in the bores will be chosen in such a way that for practical purposes acceptable tiltability will be obtained.

It is further preferred to give the opening in the bottomplate a slight slope and to adapt it to the spherical top part of the body that is acting as a joint. Thus the possibility that hay, dirt and dust will accumulate in the contact area of bottom plate and body, and deposition is diminished. In this way the construction obtains as it were a self-cleaning effect because whatever the position of the bottom, hay, dust or other dirt cannot penetrate or cause the bottom to be jammed. The spherical body, which is spherical at the top is preferably solid and consists of an inert material like nylon or another non-compressible, not moisture-sensitive and non-corrosive plastic material. Nylon bearing material is preferred.

The body which is spherical at the top is usually shifted loosely on the guide bar, where it is kept firmly in position by the pressure of the springs. This provision is of importance to cause the pressure to be equally divided over the total surface of the rack when the horse is eating at the side thereof, as already mentioned above. The dimensions of the box as well as the spring tension are naturally adjusted dependent on the horses to be fed, the type and weight of the hay and the location.

In a preferred embodiment of the invention the haybox is attached to the wall, the rack being adjusted to the desired height and the dimensions being chosen such as to allow at least part of the bale of hay to be fitted into the box. Thus the construction of the box may be narrower, which yields considerable saving of space. Further the box is attached with a small inclination with respect to the wall, which for the horse is easier.

An additional means may suitably be provided at the lower part of the bottom, so that the bottom may be fixed in place when it is desired to clean the box or, for instance, to replenish additional loose hay, owing to which it is not necessary to keep down the bottom by hand. Generally the weight of the loose hay suffices to keep the bottom down. The rack is suitably, by means of hinges at the back side, placed on the box, so that the hay can be placed by opening the rack. At the front of the box a lock should be provided of such a type as will not be accident be unfastened by the horse. The crossbar of the rack serves as a safeguard and moreover functions as a grip and as a chafing bar.

The haybox will now be described with reference to the drawings, in which

FIG. 1 is a perspective view of the haybox 1, the back side of which has been removed for the sake of clarity; this box is placed on the floor.

FIG. 2 shows the upper part, the rack, of the box.

FIG. 3 represents the anchoring of the free moving bottom of the haybox, of which FIG. 4 shows an enlarged detail, while FIG. 5 is a side view of a box suspended from the wall and provided with two pressure springs.

FIG. 6 is a perspective view of one embodiment of a haybox according to the present invention combined with and integrated in a stable structure.

In FIG. 1 the inner construction of the box 1 is shown, with the two side walls 2a and 2b. This box is closed by the cover 3, consisting of a composition of bars in the form of a rack, wherein between each of the crossbars 4 a vacancy 5 has been left with a clearance commonly used for racks.

The cover is at the front provided with a bar 6, by means of which the rack may be lifted and closed. FIG. 2 schematically shows a closure 14, by means of which the rack is fastened. This closure is of an ordinary type, the only requirement being that it cannot accidentally be unfastened by the horse itself. The cover contains at its sides the plates 7, which are fixed above the conducting bars 10, on two sides of the rack. These plates serve to protect and to attach the bars. The free bottomplate 8 is provided with four circular recesses 9, through which the bars 10 pass. Below plate 8 on the bars 10 are fixed pressure springs 11, the dimensions of which are such as to enable them to press the bottomplate with sufficient force against the rack 3 when the box is not filled with hay. The bars are fixed to supporting plates 12, which are attached to the side walls 2a and 2b below the bottom. On the bars under the free bottom is further fixed a ball-shaped means 13. In FIG. 3 this construction is shown in such a way that the underside of the free bottom can be seen. FIG. 4 shows an enlarged form of a bar with bottom holes. The dimension of the recesses is somewhat larger than the diameter of the bar, with the result that the bottom, owing to the clearance between the bar and the recess and the ball shape of means 13, is enabled to slightly tilt or rock. A suitable clearance is chosen depending on the size and shape of the box.

FIG. 5 represents a side view of a feed box attached to the wall. In this embodiment, which has the advantage of occupying little space, the construction of the box is narrower in depth than the embodiment of FIGS. 1 and 2, wherefor it requires only two pressure springs. With this box the haybale may be put in with its narrow side. The box is at the lower and uper part attached by screws 16 via supports 17. Further the box is designed in a slightly tilting position. By means of a rail the height can be made adjustable.

Besides the embodiments described above the haybox according to the invention may be taken up in a stable as a fixed part in order to save space. The haybox may be attached to the outside of a stable door or stable wall, the cover of the box in which the rack part is included being integrated with the bars or lattice-work of the stable wall or door. The box is in this arrangement applied under the bar construction in a hingeable position and is put in a filling condition by moving it away from the stable wall or door. In this way the box comes free from the fixed rack and can be filed with hay, which is inserted through the top. Then the box is restored to its original position. This embodiment has the advantage that one need not enter the stable for feeding purposes but may serve the horse from the outside of the stable, which presents a more efficient way of working. Also, there is no loss of space in the stable. For maneges where a great number of horses have to be fed this means a substantial saving of time, it also being possible for laymen to feed the horses. The haybox without the rack is in the eating position preferably pressed against the wall and is retained by means of a lock, owing to which the box will not automatically come loose. In the filling condition, in which the box by the pivot action is moved free from the rack, it is preferably blocked by a pin or anchoring means. The bar construction of a stable door or wall, which is normally provided with bars, is in this case made in such a way that the rack forms part of it, i.e. the bars at the upper side of the woodwork to which the box is attached run along the upper side of the haybox, viz. along the side wall, front wall and other side wall and suitably run upwards slantingly, for instance 1.20 meter, back to the upper side of the bar construction. Preferably the bars of the front wall of the box do not run back to the upper wall in a straight line, but initially with a small inclination with the vertical axis and then with a larger one. This form lends more space to the horse when it is eating. In this embodiment various modifications are possible.

Thus one may make the shape of the upright bar structure aesthetical or left open at the top or one may for instance replace the bar construction by a wooden wall. Further the rack itself is preferably constructed slightly slantingly upwards, as mentioned above in respect of the other embodiments. These modifications however mainly relate to the shape of the haybox. The main principle of the embodiment described above is that the box according the invention may be combined with and integrated in a stable structure with bars, the rack being attached to the exterior of a stable wall or door in a hingeable position as a fixed part of the bar structure and the box and rack virtually forming two separate parts. Such embodiment of the present invention is illustrated in FIG. 6 in which a haybox 24 has one side connected by hinges 21 to a stable door 18 so that the haybox can be moved away from the door to permit insertion of hay into the box. The other side of the haybox 24 is engaged by a lock 22 to hold the haybox in a position under a rack 20 extending outwardly from the bars 19 of the stable door. Therefore the invention also comprises a stable wall or stable door/haybox combination wherein the rack is a fixed part of the stable door or wall and the haybox is provided at the exterior of the stable.

We claim:

1. Haybox for the feeding of horses comprising interconnected walls defining a box, a rack positioned on an upper part of the box, and a movable plate forming a bottom of the box and being movable between lowered and raised positions within said box for supporting hay, guide bars extending within said box parallel to said wall, said movable plate being provided with at least two spaced apart perforations through which said guide bars extend, pressure springs fitted on said guide bars on the underside of the movable plate for exerting upwards pressure, spherical type means positioned at least in part between said springs and said movable plate for transferring spring force to said movable plate, said spherical type means having a larger diameter than that of the perforations, the diameter of the guide bars extending through the movable plate being smaller than the diameter of the perforations in the movable plate to allow the latter to carry out a tilting movement with respect to walls of the box.

2. Haybox according to claim 1, characterized in that the rack is constructed as a fixed part of a stable construction provided with bars, like a stable door or stable wall, and the box is positioned at the exterior of the stable.

3. Haybox according to claim 2, wherein the rack is a fixed part of the bars.

4. Haybox according to claim 1, wherein the edges of the perforations in the movable plate are slightly sloped, in such a way that they follow the circumference of a spherical top part of the spherical type means.

5. Haybox according to claim 1, wherein said top part substantially fits in the perforation of the movable plate.

6. Haybox according to claim 5, wherein the spherical type means is spherical at the top part and flattened at the bottom part.

7. Haybox according to claim 1, wherein the spherical type means comprises a non-compressible plastic body.

8. Haybox according to claim 7, wherein the spherical type body consists of nylon bearing material.

9. Haybox according to claim 1, wherein the spherical type means has a body loosely fitted on the guide bar and is pressed against the bottom of the movable plate.

10. Haybox according to claim 1, wherein the walls of the box are inclined with respect to the horizontal.

11. Haybox according to claim 1, further comprising supports connectable to a vertical surface and screws for connecting said supports to such surface, said haybox being supported by said supports in such manner that a lower portion of the haybox is closer to the surface than an upper portion whereby walls of the haybox are slanted with respect to the surface.

12. Haybox according to claim 1, wherein supporting plates are fixed to said walls below said movable plate, lower ends of said guide bars being supported by said supporting plates and said pressure springs being positioned between said supporting plates and said spherical type means.

13. Haybox according to claim 1, further comprising supports connectable to a vertical surface and screws for connecting said supports to such surface, said haybox being supported by said supports in such manner that a wall of the box is adjacent the vertical surface.

* * * * *